United States Patent
Tevaarwerk et al.

[11] Patent Number: 6,097,115
[45] Date of Patent: Aug. 1, 2000

[54] COUNTERBORED ROTORS FOR NATURAL FREQUENCY VARIATION

[75] Inventors: Joseph L. Tevaarwerk, Clayton; Larry B. Wells, St. Louis, both of Mo.

[73] Assignee: Emerson Electric Co., St. Louis, Mo.

[21] Appl. No.: 09/251,067

[22] Filed: Feb. 18, 1999

Related U.S. Application Data

[62] Division of application No. 08/977,637, Nov. 24, 1997, abandoned.
[60] Provisional application No. 60/031,963, Nov. 27, 1996.

[51] Int. Cl.$^7$ .............................. H02K 5/24; H02K 1/00; H02K 1/06; H02K 1/22
[52] U.S. Cl. .............................. 310/51; 310/42; 310/216; 310/261
[58] Field of Search .............................. 310/51, 216, 217, 310/261, 211, 42; 29/598

[56] References Cited

U.S. PATENT DOCUMENTS

| | | | |
|---|---|---|---|
| 1,631,102 | 5/1927 | Leake | 310/68 E |
| 1,979,480 | 11/1934 | Leland | 310/68 E |
| 3,234,419 | 2/1966 | Picozzi | 310/211 |
| 3,802,068 | 4/1974 | Scott | 310/42 |
| 3,955,112 | 5/1976 | Sell | 310/86 |
| 3,990,141 | 11/1976 | Stark | 310/42 |
| 4,012,653 | 3/1977 | Shigeta et al. | 310/217 |
| 4,282,451 | 8/1981 | Bratoljic | 310/262 |
| 4,783,608 | 11/1988 | Gruber et al. | 310/90 |
| 4,970,422 | 11/1990 | Lind | 310/90 |
| 5,036,235 | 7/1991 | Kleckner | 310/90.5 |
| 5,153,475 | 10/1992 | McSparren | 310/254 |
| 5,245,234 | 9/1993 | Okada et al. | 310/51 |
| 5,349,259 | 9/1994 | Kaneko et al. | 310/261 |
| 5,473,211 | 12/1995 | Arkkio | 310/166 |
| 5,481,142 | 1/1996 | James et al. | 310/51 |
| 5,767,607 | 6/1998 | Kieffer | 310/261 |

FOREIGN PATENT DOCUMENTS

| | | |
|---|---|---|
| 535 706 A1 | 2/1991 | European Pat. Off. . |
| 1 405 247 | 9/1972 | United Kingdom . |

*Primary Examiner*—Clayton LaBalle
*Attorney, Agent, or Firm*—Howell & Haferkamp, L.C.

[57] ABSTRACT

A motor having improved resistant to vibration has a shaft, a pair of bearings engaging the shaft, a set of pressed-on laminations stacked axially on the shaft between the pair of bearings, and a stator. Only a portion of the set of laminations actually engage the shaft, preferably because the central hole of some of the laminations is enlarged slightly by counterboring. Alternately, the diameter of the shaft or the length of splines on the shaft that engage the laminations may be adjusted so that not all of the laminations engage the shaft. A method of tuning a rotor to reduce unwanted noise and vibration from a motor includes the steps of selecting a first motor, measuring the natural frequency of the rotor system of the motor, selecting an increment to the natural frequency, and adjusting the construction of a second motor in accordance with the direction of the desired increment. If the desired increment is downward in frequency, the length of the region of engagement of the laminations to the shaft is reduced. If the desired increment is upward in frequency, the length of the region of engagement of the laminations to the shaft is increased. The adjustment of the length of the region of engagement is accomplished by a very slight counterboring of the central hole of some number of laminations, the actual number depending upon whether the first motor included such counterbored laminations and whether the increment is up or down. Alternately, the adjustment of the length of the region of engagement may be accomplished by adjusting the diameter of one or more portions of the shaft. Otherwise, the construction of the first and the second motors is the same, so that the motors have essentially the same size and weight, but different resonant frequencies.

16 Claims, 5 Drawing Sheets

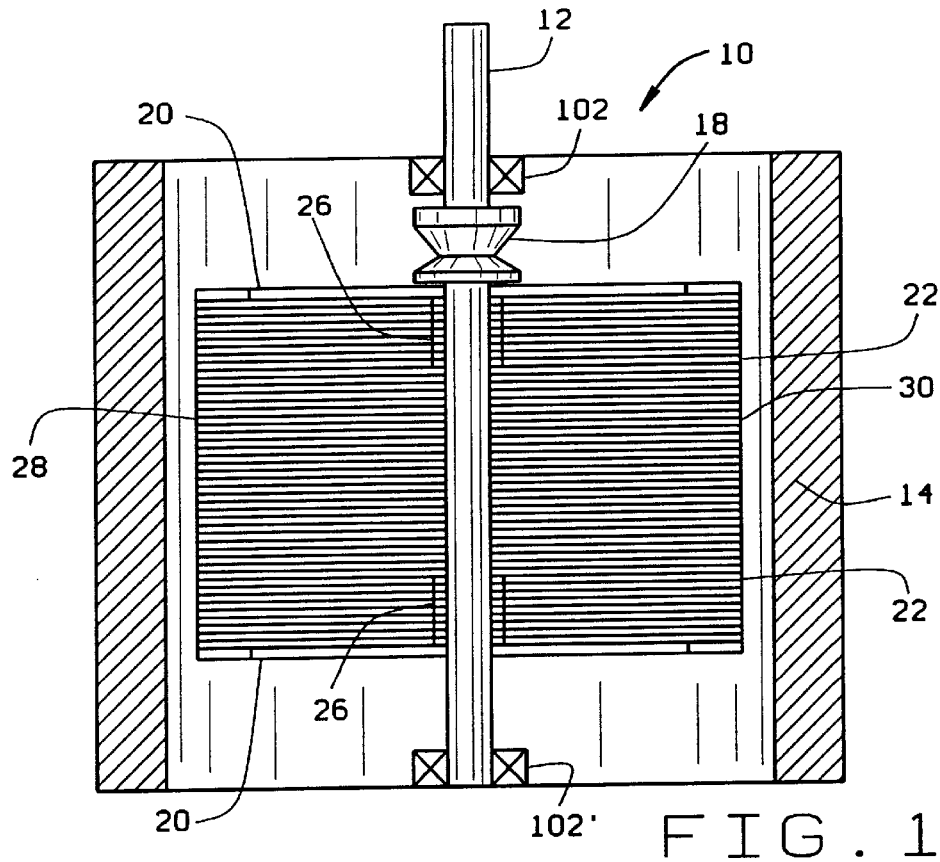
FIG. 1
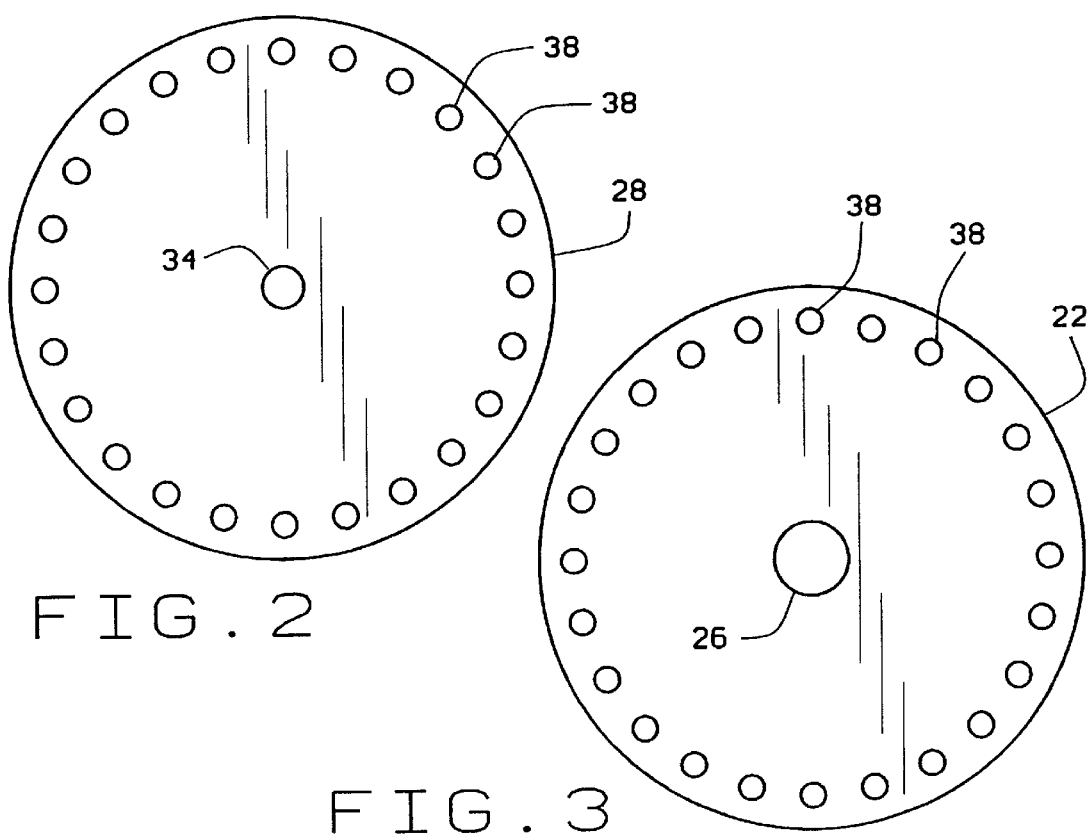
FIG. 2
FIG. 3

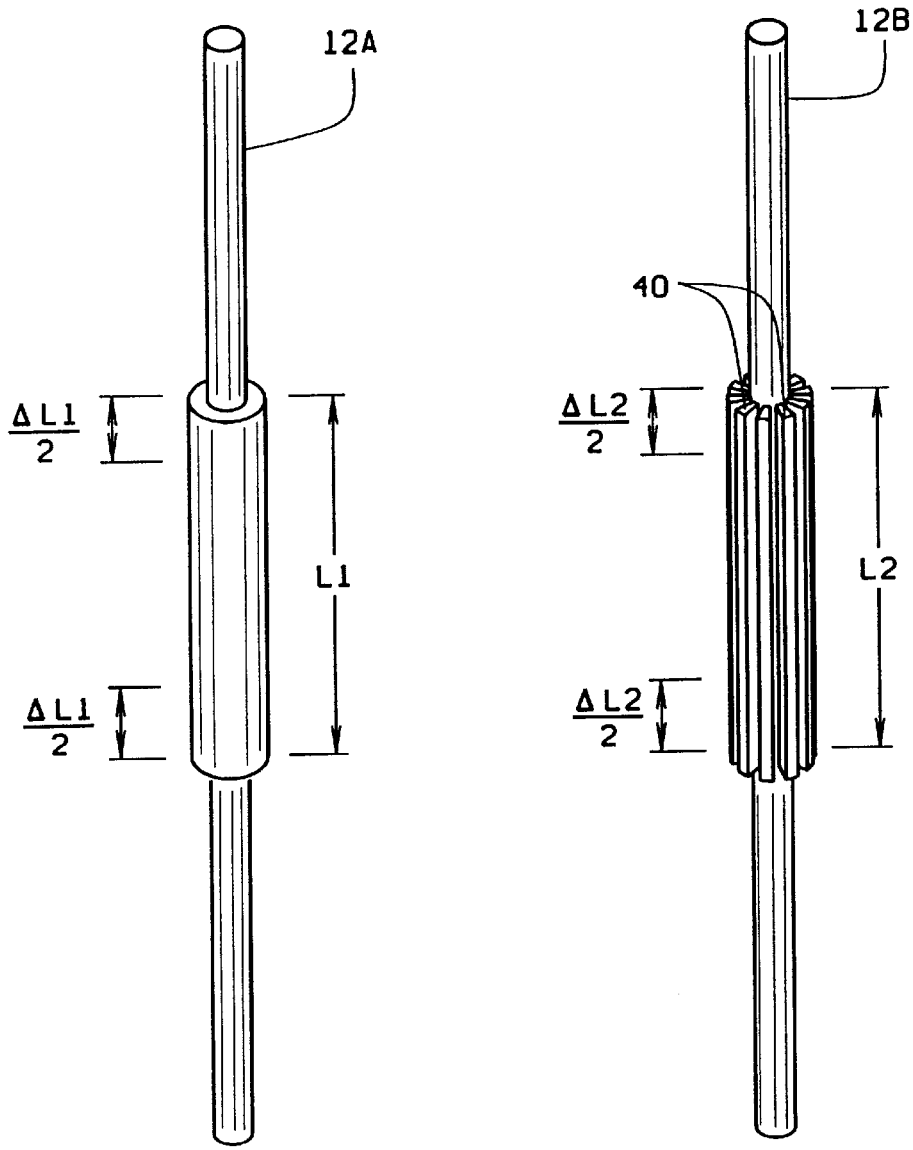
FIG. 4                    FIG. 5
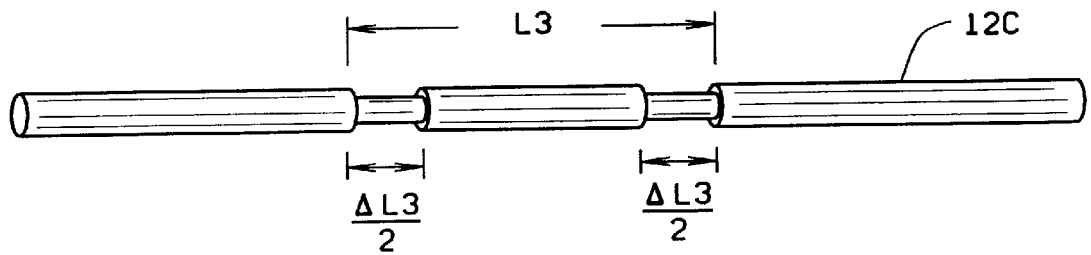
FIG. 6

COUNTERBORED ROTORS FOR NATURAL FREQUENCY VARIATION

This application is a divisional of application U.S. Ser. No. 08/977,637 filed on Nov. 24, 1997, now abandoned which claims the benefit of U.S. Provisional Application No. 60/031,963, filed Nov. 27, 1996. The disclosure of copending application U.S. Ser. No. 08/977,637 is herein incorporated by reference in its entirety.

BACKGROUND AND SUMMARY OF THE INVENTION

1. Field of the Invention

This invention relates to a method of reducing noise produced by motors and to the motors produced by this method, and more particularly to a method of tuning the natural frequency of a rotor and to motors incorporating such tuned rotors.

2. Description of the Prior Art

When the natural frequency of a rotor in an induction motor is close to a harmonic of the input frequency of the supply voltage (e.g., for 60 Hz, the first harmonic is 120 Hz, the third harmonic is 240 Hz, and the successive odd harmonics are 360 Hz, 480 Hz, etc.), unwanted noise and vibration can be generated. There is a correlation between rotor natural frequency and motor noise.

Three speed motors have been used in washing machines for a number of years and have provided very satisfactory service. Several, seemingly small, adjustments were recently made to manufacturing methods for these motors, including the use of an interlock rotor lamination system, use of counterbore laminations for manufacturing convenience, and stack height control through measurement rather than lamination counting. As these adjustments were introduced, a rather noticeable change occurred in the sounds emitted from the motors We shall refer to this sound as "bearing knock."

Bearing knock is a phenomena that occurs when cyclical forces on the rotor system cause sufficient movement in the bearing clearance to move the shaft from one end of the clearance to the other. The knocking sound that is heard is the impacting of the shaft on the bearing surface. The problem of bearing knock is most severe when the speed of rotation is low, because bearing oil film thickness and damping is at its lowest in this situation. At higher speeds, the bearing film thickness increases, the stiffness decreases, and the damping increases. Bearing knock is of lesser severity as higher speeds because of these more favorable conditions.

Bearing knock is affected by two major factors, the first of which is electromagnetic imbalance in the rotor that causes a side-to-side force on the rotor. Causes that contribute to such imbalance are dynamic air gap variation due to rotor eccentricity, or defective rotor conductor bars. The second major factor affecting bearing knock is the system response to the forcing mechanism. If the forcing mechanism drives the system close to the natural frequency of the rotor/shaft system, the vibrational amplitude will become amplified. Small changes in the construction of a rotor, such as changes from lose lamination construction to interlock construction, may shift the natural frequency of the rotor/shaft system enough to cause an objectional amplification of vibration.

To better understand the nature of the problem and the inventive solution, it is helpful to consider the response of an undamped rotor-mass spring system, which is modelled schematically as a simple forced vibration system in FIG. 8. This model comprises the mass of rotor 100, a spring comprising the shaft 12 and bearings 102 and 102', and a driver comprising unbalanced rotor forces F. In the model, we shall assume that the unbalanced rotor forces are mostly electromagnetic forces, and that the excitation is sinusoidal.

The equation of motion for this system in one of the planes of motion is given by:

$$m\ddot{y} + ky = F_0 \sin \omega t$$

where m=the mass of the rotor;

k=the shaft/rotor stiffness;

$F_0$=the amplitude of the driver force;

y=the displacement from the rest state; and $\omega$=the driver frequency, in radians per second.

This expression may be solved for y to give a steady-state result:

$$y = \frac{F_o/k}{1 - [\omega/\omega_n]^2} \sin(\omega t)$$

where $$\omega_n = \sqrt{\frac{k}{m}}$$

is the natural frequency of the rotor.

The response of this system depends on the magnitude of the forcing function, the stiffness of the shaft, and the ratio of the driving to the natural frequency. The vibration is in the form of a sinusoidal motion. Usually, only the amplitude of this motion is of interest, and this amplitude is expressed as:

$$y = \frac{F_o/k}{1 - [\omega/\omega_n]^2}$$

This maximum displacement is plotted in FIG. 9 for a number of different values of $F_o/k$ as a function of the natural frequency $\omega_n$ divided by the excitation frequency $\omega$. FIG. 9 shows that the vibrational amplitude increases rapidly as the excitation frequency gets closer to the natural frequency of the rotor-shaft system. It also shows that the amplitude increase as the driving function increases. When a system vibrates at the natural frequency, it is said to resonate. Very little energy is required to keep the vibrational amplitude large. The vibrations of the rotor mass are restrained by the bearing system. If the amplitude of the vibration is large at the rotor, it will lead to large forces at the bearing. This, in turn, allows the shaft to move within the bearing clearance, and cause bearing knock.

The noise and vibration that occurs due to resonance in the rotor system can be reduced or eliminated either by changing the mass of the rotor, changing the distance between bearing centers, or changing the shaft stiffness. However, construction constraints may limit the range of options. For example, the rotor mass can be changed only within size constraints of the rotor. Only limited amounts of material can be removed if the electrical properties and strength of the rotor are to remain the same. Also, the distance between rotor bearings may be constrained by material cost and the application in which the motor is used. In addition, it may be impractical to change the shaft stiffness by substituting a shaft having a different diameter throughout its entire length because a different diameter shaft may require the use of nonstandard bearing sizes and may increase machining costs.

Counterboring of rotor laminations for "hot dropped" rotors is known. This manufacturing technique involves heating a stack of rotor laminations so that they expand and can easily accommodate a shaft, and then "hot dropping" them onto the shaft. As the rotor stack cools, it shrinks onto the shaft. Compressive forces resulting from this shrinkage hold the laminations onto the rotor shaft. For manufacturing convenience, it was found to be advantageous to counterbore some of the outer laminations of the stack so that the stack of laminations could be more easily dropped onto the shaft. However, because attention had not been given to the change in natural frequency caused by the counterboring, and because the source of the noise was not fully known, many motors using "hot dropped" rotors proved unsatisfactorily noisy, and the practice of counterboring outer laminations was limited. Furthermore, no "press-on" rotors (i.e., rotors made by pressing a stack of rotors onto a shaft without the aid of a relative temperature difference between the rotor stack and the shaft) are known to have used counterbored laminations for noise control.

In view of all of the above, it would be advantageous to provide motors that avoid increased noise due to bearing knock. It would further be advantageous to provide a method for adjusting the natural frequency of rotor systems in motors in a manufacturing environment without substantially altering the size, weight, or electrical properties of the motor.

SUMMARY OF THE INVENTION

We have found that there is a very strong correlation between rotor natural frequency and motor noise, and that the amount of shaft engagement by the rotor laminations drastically affects the system natural frequency. The reduction in shaft engagement that results from counterbore laminations, shaft diameter reduction, or spline reduction (or some combination thereof) has the effect of lowering the natural frequency of the rotor system. It should be noted, however, that the removal of too much lamination material by counterboring has the unwanted effect of actually raising the natural frequency of the rotor system, so the desired effect is best achieved by counterbores or punches of about 0.01 inch in diameter greater than the diameter of the shaft, or an equivalent reduction in the diameter of the shaft or size of the splines on the shaft. (In the event the shaft is not round, other methods for introducing a small gap between some of the laminations and the shaft, such as punching a slightly larger center hole, may be used.) As would be apparent to one skilled in the art, if counterboring of this type is already used for rotor laminations, then reducing the number of such laminations will raise the natural frequency of the rotor system, which may be desirable in some cases.

There is thus provided, according to a first aspect of the invention, a motor having improved resistant to vibration, the motor having a shaft, a bearing engaging the shaft, a set of pressed-on laminations stacked axially on the shaft, and a stator. (The laminations may alternately be hot-dropped or set on the shaft in another suitable way.) According to the invention, only a portion of the set of laminations engage the shaft, preferably because the central hole of some of the laminations is enlarged slightly by counterboring. Alternately, the diameter of the shaft or the length of splines on the shaft that engage the laminations may be adjusted so that not all of the laminations engage the shaft.

According to another aspect of the invention, there is provided a method of tuning a rotor to reduce unwanted noise and vibration from a motor. This method, in its most basic form, includes the steps of selecting a first motor, measuring the natural frequency of the rotor system of the motor, selecting an increment to the natural frequency, and adjusting the construction of a second motor in accordance with the direction of the desired increment. If the desired increment is downward in frequency, the length of the region of engagement of the laminations to the shaft is reduced. If the desired increment is upward in frequency, the length of the region of engagement of the laminations to the shaft is increased. The adjustment of the length of the region of engagement is accomplished by a very slight counterboring of the central hole of some number of laminations, the actual number depending upon whether the first motor included such counterbored laminations and whether the increment is up or down. Alternately, the adjustment of the length of the region of engagement may be accomplished by adjusting the diameter of one or more portions of the shaft. Otherwise, the construction of the first and the second motors is the same, so that the motors have essentially the same size and weight, but different resonant frequencies.

It is therefore an object of this invention to provide an easily manufactured motor having improved resistance to vibration and noise.

It is a further object of the invention to provide a drop-in replacement for a motor having essentially the same size and weight as a motor being replaced, but greater resistance to vibration and noise.

It is a still further object of the invention to provide a method of tuning a rotor to reduce unwanted noise and vibration from a motor.

These and other objects of the invention will become apparent to those skilled in the art upon reading the detailed description of the invention and studying the accompanying figures.

BRIEF DESCRIPTION OF THE DRAWINGS

FIG. 1 is a drawing of a motor in accordance with the invention;

FIG. 2 is a drawing of a single lamination without counterbore;

FIG. 3 is a drawing of a single lamination with counterbore;

FIG. 4 is a drawing of a rotor shaft that has an increased diameter in the region of mounting of the lamination stack;

FIG. 5 is a drawing of a rotor shaft having splines in the region of mounting of the lamination stack;

FIG. 6 is a drawing of a rotor shaft having a reduced diameter in a portion of the region of mounting of the lamination stack;

Figure 7:
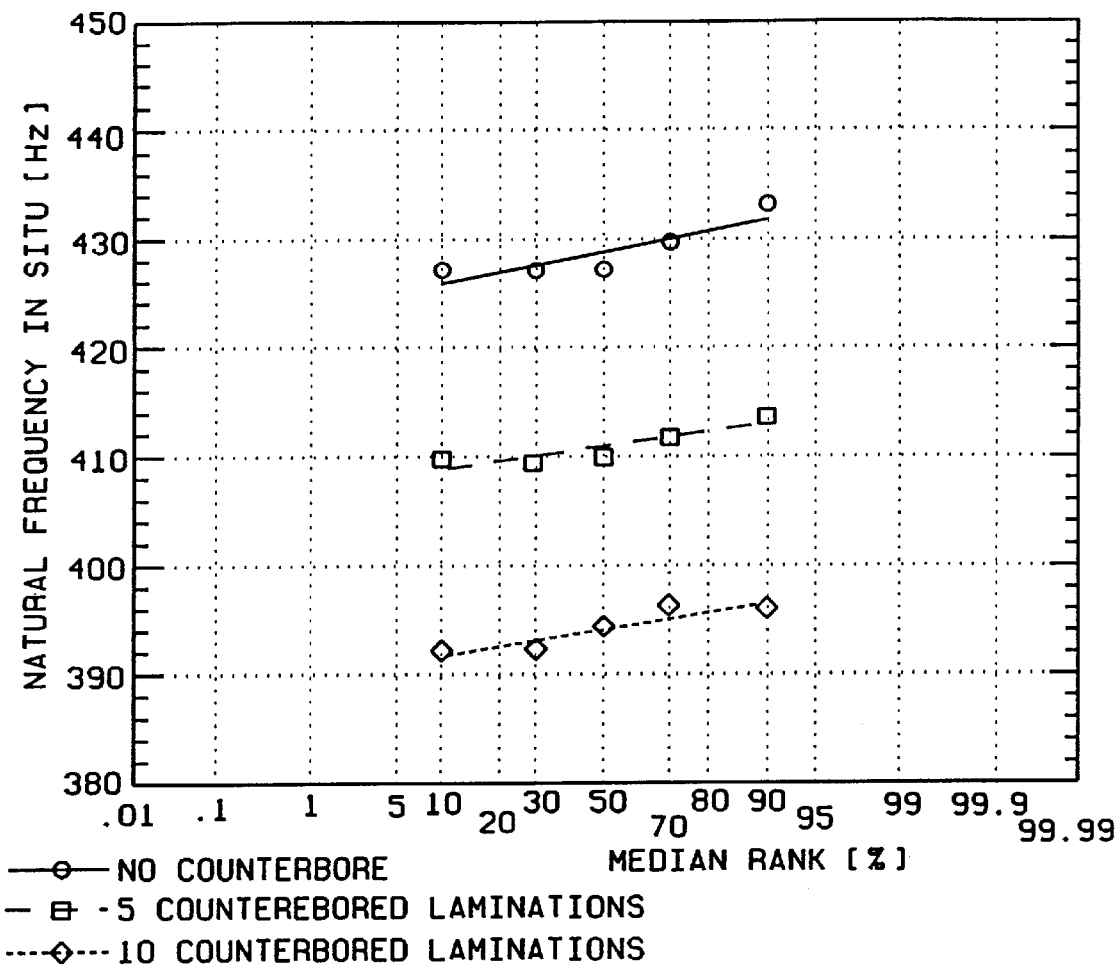
FIG. 7 is a graph showing the lowering of the resonant frequency of the rotor system of a motor through the use of counterbore laminations.

It should not be assumed that the drawings are necessarily drawn to scale.

DETAILED DESCRIPTION OF THE INVENTION

In the description and the appended claims, motors said to have "like dimensions" should be understood as referring to motors having such similar dimensions and construction as would be expected of mass-produced motors of the same model and type picked at random off an assembly line. Some variation within normal manufacturing tolerances is to be expected and is intended to be encompassed by the phrase "like dimensions."

In accordance with this invention, steps taken to control vibration and noise comprise the following:

First, a motor that is to be tuned is selected. This motor may be a prior art motor that is to be improved, or a motor of a new design. Whichever type of motor is used, it should be noted that the size of the rotor (and hence, of the motor) in the improved, tuned design is not changed from that of the original rotor by using the inventive method, nor is the weight substantially changed.

Next, the natural frequency of the motor is measured. Because of manufacturing variations, it is preferable to measure the natural frequency of at least 5 or 10 rotors and average the results to reduce the likelihood that one or two anomalous rotors selected from the assembly line will unduly influence the measurement of the natural frequency of the typical rotors. An impact hammer can be use to strike the rotor shaft for the purposes of measuring its resonant frequency. It should be recognized that the rotor resonant frequency measured this way will be higher than that of an operational motor because of lubricant films, because a layer of lubricant between the shaft and the bearing introduces an additional spring element, and also some damping into the system.

Depending upon the resonant frequency measured in the preceding step, a new motor is constructed of like dimensions to the original motor, except that a selected number of preferably, but not necessarily end laminations (i.e., as in FIG. 12, the inventive method can be practiced with inner counterbored laminations 200, with non-counterbored laminations 202 between the inner counterbored laminations and the ends 204 of the rotor, and vibration-controlled motors 10' can be made using such a construction) are counterbored to lower or raise the natural frequency of the motor according to a desired increment, so that, during running of the motor, the motor does not pass through its natural frequency. If the frequency is to be lowered, more laminations in the new motor are counterbored than in the original motor. If the frequency is to be raised, fewer laminations in the new motor are counterbored than in the original motor. Thus, the number of counterbored laminations (or the length over which the laminations engage the shaft) is a decreasing function of the resonant frequency, i.e., as the resonant frequency increases, the number of counterbored laminations decreases, if all other variables remain constant. (If no laminations were counterbored in the original motor, it will not be possible to raise the natural frequency of the second motor by this method.)

It will, of course, be recognized that a number of counterbored laminations can be directly determined from a desired resonant frequency and thus, directly selected, if the relationship between these two quantities is known. The relationship can be determined either theoretically or empirically.

The above discussion assumes that the shaft upon which the laminations of the motor are mounted has a diameter such that the laminations engage the shaft unless they are counterbored. One skilled in the art would recognize that shaft-lamination engagement can be affected either by counterboring the lamination or by adjustment of the diameter of a portion of the shaft or of splines on a portion of the shaft, and that adjustments that affect engagement can also be used to adjust the natural frequency of the rotor system.

The size of the counterbore is approximately 0.01" (or preferably less) greater in diameter than the rotor shaft, when both the rotor lamination and the shaft are at an operating temperature. The intent is to change the magnetic properties of the rotor as little as possible by removing as little of the magnetic material as possible, yet to completely free the shaft of compressive force that would otherwise be caused by the lamination were it not counterbored and thus touching the shaft. This can be accomplished by making the counterbore only a few thousandths of an inch larger than the shaft diameter so that it does not touch the shaft. Alternately, the shaft diameter itself can be made slightly smaller (by about the same amount in diameter) in a region that would otherwise be engaging the rotor laminations. While the exact size of the counterbore is not critical, it must be kept small, because the reduction of mass of the rotor that would otherwise occur would tend to increase the natural frequency of the rotor system. At some point, this would null out the decrease that occurs due to reduced shaft engagement resulting from the counterboring. Also, the counterboring should preferably be only a few thousandths of an inch larger than the shaft diameter to avoid interference with actuators or other parts that use the rotor as a positioning surface. Typically, washing machines use a centrifugal switch or actuator mounted on the rotor shaft to sense the speed of the rotor during start-up and for switching power from the motor's start coil to the motor's run coil. The centrifugal switch mounted on the rotor shaft commonly uses the surface of the outer lamination of the rotor as a positioning surface, as a (typically cylindrical) member of the actuator slides along the shaft of the rotor. It is therefore desirable, when counterboring the outer laminations of the rotor, to avoid making the counterbores so large as to interfere with the use of either outermost lamination as a positioning surface for the sliding member of the actuator. Alternately, the rotor shaft's diameter may be reduced over a selected region or regions so that the shaft does not engage the laminations in that region or regions.

Some shafts are made with a larger diameter in the region over which the motor laminations are to be mounted, or the shafts may be made with splines that frictionally engage the laminations. If this is the case, the axial length of the shaft enlargement may be adjusted, or the axial length or radial height of the splines may be adjusted to reduce the extent of engagement with the shaft.

It should be noted that a combination of adjustments may be made, such as a reduction in the diameter of the shaft together with a counterboring of the rotor laminations. However, combinations such as this are not necessary to realize the benefits of the invention. Moreover, such combinations may be counterproductive in at least some instances. For example, a reduction in the shaft diameter together with a counterboring of the laminations would effect a small increase in the resonant frequency of the motor over the frequency that would otherwise be achieved, because of the unnecessary counterboring of the rotor laminations. However, if the counterboring is small, the increase may be inconsequential.

A motor 10 in accordance with the invention is illustrated in cross-sectional form in FIG. 1. The motor comprises a shaft 12 upon which a stack of laminations 30 are mounted, for example, by press fitting or by a hot drop method. The motor further comprises a conventional stator 14, a set of bearings 102, 102', and may include a centrifugal switch actuator, shown schematically at 18. (the invention is applicable to motors having any number of bearings.) A number of the laminations 30, preferably at the ends are laminations 22 that include counterbores 26. Other laminations 28 do not. The number of such laminations 30 including counterbores 26 is determined by the inventive procedure described above. As shown in FIGS. 2 and 3, each lamination 28 has a center hole 34 for shaft 12, while center counterbore 26 of laminations 22 is larger than center hole 34 of laminations 28, so that laminations 22 do not engage shaft 12. Although laminations 22 are not frictionally engaged with shaft 12, they may be constructed to interlock with one another, or they may be held in place by end rings 20 of a conventional, cast metal squirrel cage winding. Conductor bars connecting the end rings 20 are not shown in FIG. 1, but would pass through conductor slots 38 in laminations 30, thus joining rings 20 at the ends of the stack of laminations. Conductor slots 38, as shown in FIGS. 2 and 3, are meant only to be indicative of conventional conductor slots, and are not necessarily drawn to scale nor are they meant to suggest any particular arrangement or shape of slots, which would normally be determined by factors outside of the scope of the invention. Also, none of the figures is necessarily drawn to scale.

Figure 12:
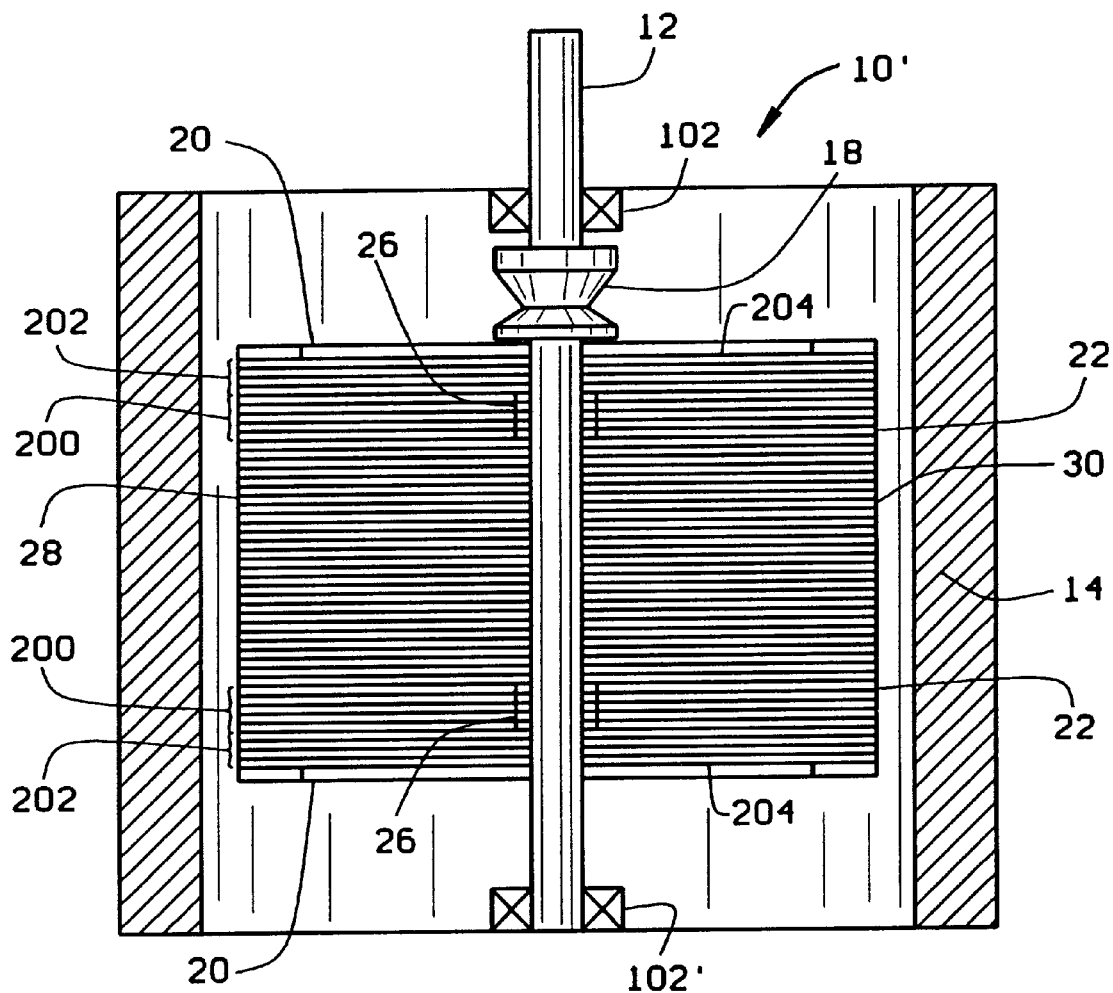
FIG. 12 is a drawing of a motor having counterbored laminations positioned between non-counterbored laminations in accordance with the invention.

A variant motor 10' is shown in FIG. 12 to illustrate that the counterbored laminations 22 need not be located on the ends of laminations 30. In motor 10' a stack 202 of one or more non-counterbored laminations 28 is positioned between a stack 200 of one or more counterbored laminations 22 and an end 204 of laminations 30.

As an alternative to counterboring laminations, it is also possible to alter the effective diameter of the shaft to reduce the amount of engagement with the laminations. For example, if a shaft such as shaft 12A, as shown in FIG. 4, is used, in which a thickened portion of shaft 12A denoted by length L1 actually engages the center of the laminations (not shown), the total length L1 of the thickened portion may be adjusted so that the length of shaft 12A actually engaging the laminations mounted thereon is reduced. Preferably, the diameter of equal portions $\Delta L1/2$ of the thickened portion of the shaft at both ends of the thickened portion would be reduced, but one or more sections along any part of length L1 may be reduced in diameter to effect a reduction in shaft-lamination engagement. For a shaft 12B employing splines 40 in a region of length L2 to mount a stack of laminations, as shown in FIG. 5, the total length L2 of the region with splines would be reduced, preferably (but not necessarily) by eliminating the splines 40 in regions $\Delta L2/2$ at both ends of length L2. If no splines or thickened region is used, and a constant-diameter shaft such as 12C in FIG. 6 is employed, the shaft-lamination engagement may be reduced in a length L3 of shaft 12C where lamination engagement otherwise would occur by reducing the diameter of shaft 12C, preferably by an amount $\Delta L3/2$ at each end of length L3 as illustrated. Care should be taken in cases in which shaft diameter is reduced to avoid introducing weaknesses in the shaft, remembering that it is sufficient for purposes of the invention to reduce the diameter by the minimum amount necessary to eliminate shaft-lamination engagement and the resulting stiffening of the shaft.

It will, of course, be recognized by those skilled in the art that the scope of the invention is not limited to round, cylindrical shafts, and that the invention can readily be extended to shafts having other cross-sections, either by varying the size of the cross-section of the shaft or by varying the size of the hole in the laminations that accommodate the shaft, or some combination of both.

To illustrate the effect of increasing the number of counterbored laminations in a motor, samples of a typical induction motor comprising seventy interlocked laminations of 0.012" annealed lamination steel were tested by striking the rotor of a stationary motor in situ with an impact hammer. The lowest peak frequency of excitation is the first natural frequency of the rotor system. The natural frequency measured this way will be slightly higher than that for an operational motor because of lubricant films, since a layer of lubricant between the shaft and the bearing introduces both damping and an additional spring element into the system, but it is indicative of the reduction in natural frequency that is obtained in accordance with the invention. Motor selection was made at random from groups of motors made with zero, five, and ten counterbored laminations, and at least 5–10 samples were selected from each group. The 10th, 30th, 50th, 70th, and 90th percentile frequencies were obtained and plotted, as shown in FIG. 7. It will be observed from FIG. 7 that the number of counterbore laminations (i.e., the number of laminations that do not engage the shaft) has a substantial influence on the natural frequency of the rotor assembly, and that, by increasing the number of counterbored laminations, the natural frequency can be adjusted, if necessary, by trial and error, to a value at which resonances do not occur at harmonics of the line frequency applied to the motor.

Appendix

Tests on one type of motor constructed by the assignee of this patent led to the discovery that the rotor was being excited by the electrical line input of 60 Hz and excited in the radial direction at 360 Hz. It was further discovered that if the rotor was slowly rotated in the motor by hand, with the auxiliary winding disengaged, there was a "worst case" rotor orientation for 360 Hz noise, which indicated that bearing knock was being caused by a once-per-revolution excitation. For this type of excitation, there must be an electrical imbalance in the stator and in the rotor. In the motor used for this experiment, there was an imbalance in the stator because of a shared 6-pole winding. The electrical imbalance in the rotor could have been due to concentricity or differences in the rotor bars, or because of a non-uniform air gap. The motors tested had a good air gap with a concentricity of 0.001.

As the input frequency was varied, the amplitude of the rotor vibration varied as well. The amplitude at 6 times the line frequency (i.e., 360 Hz) was five times greater than the amplitude at 300 Hz with a 50 Hz line frequency, and tests indicated that the rotor was being excited at a natural resonance. It was further discovered, by testing of different rotors, that rotors having a natural resonance closer to 360 Hz exhibited the worst bearing knock.

Although all of the rotor systems had natural resonances greater than 360 Hz, it was discovered in operation that bearing knock increases with these motors after the first one to three minutes of operation, because the first bending mode of the rotor gets closer to 360 Hz. It is believed that the oil film on the bearings can have an effect on the response of the rotor, or on the natural frequency of the rotor in the system.

There are three possible causes for the reduction of the natural frequency:

(1) A change in the distance between supports due to the oil film;

(2) The oil film provides an additional spring system; and (3) The spring constant changes because the metal in the shaft is heated.

Figure 8:
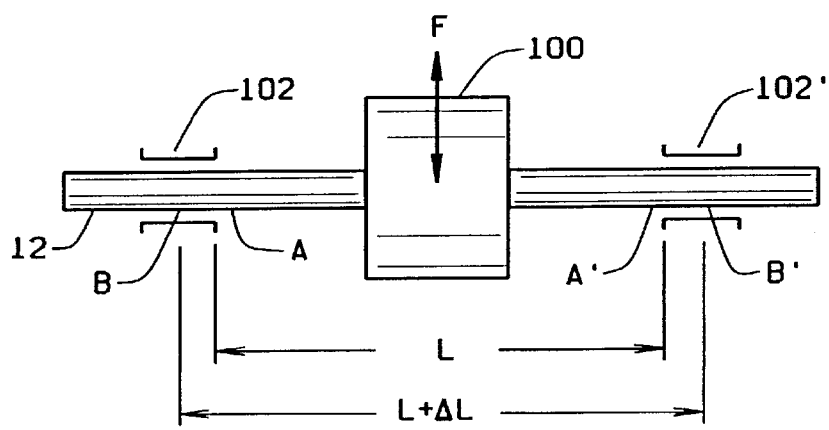
FIG. 8 is a schematic drawing of a rotor system of a motor.
Figure 9:
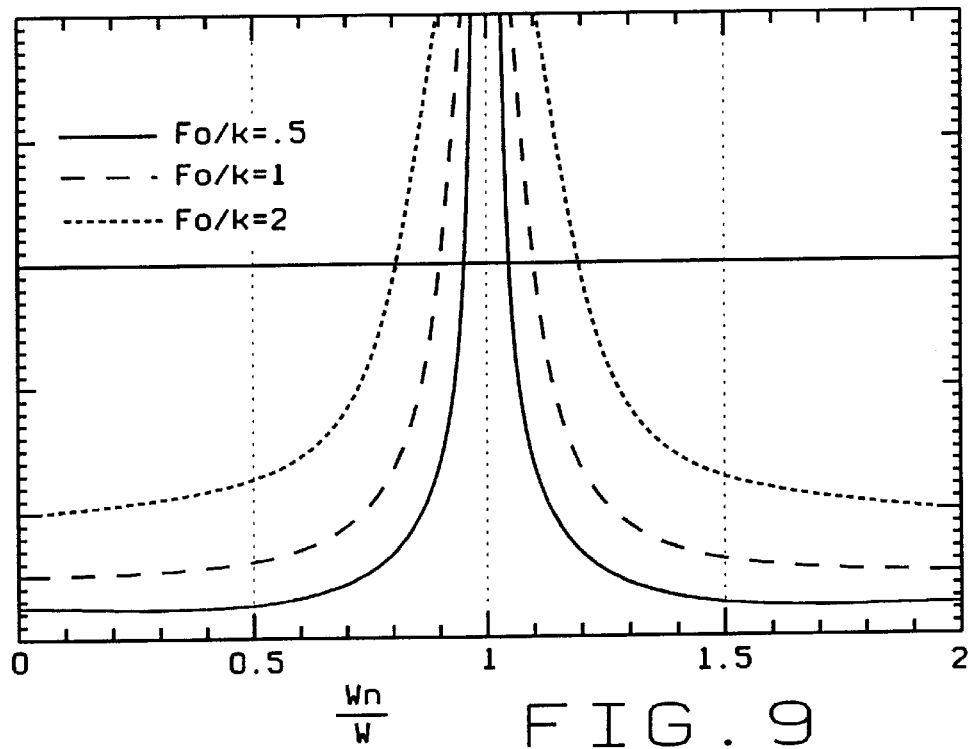
FIG. 9 is a graph of displacement of a rotor shaft as a function of excitation frequency.
Figure 10:
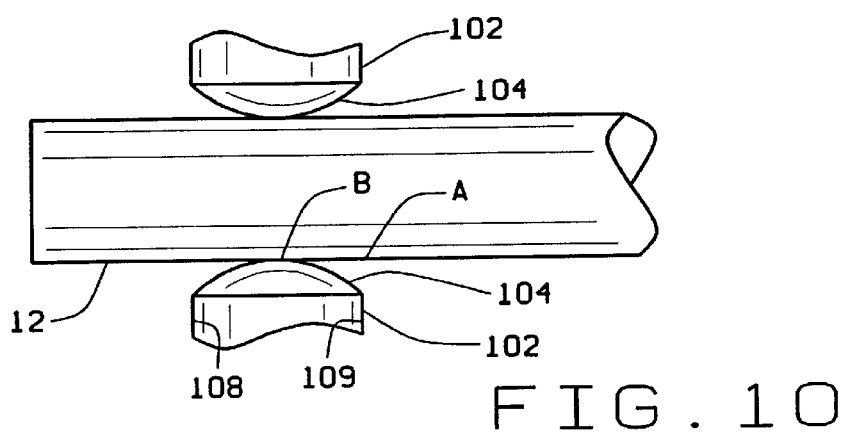
FIG. 10 is a schematic drawing of an oiled bearing assembly on a rotor shaft.
Figure 11:
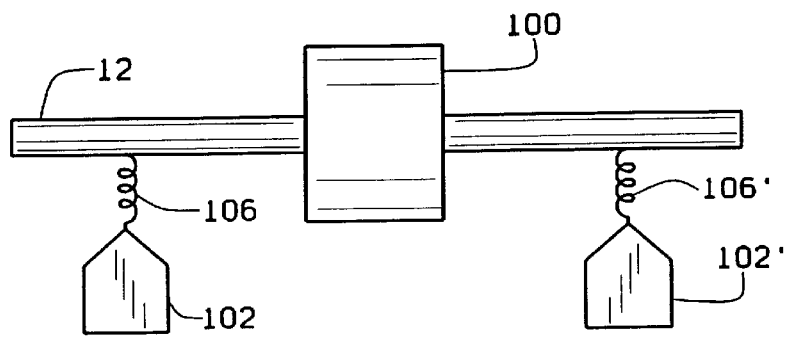
FIG. 11 is a schematic drawing showing an effective spring constant of the oiled bearing assembly on the rotor shaft.

A change in the distance between supports due to the oil bearings is illustrated in FIGS. 8 and 10. The natural frequency of a motor is given by:

$$f_n = \frac{1}{2\pi}\sqrt{\frac{48 EIg}{\left(W_r + \frac{1}{2}W_s\right)L^3}}$$

where:

E=the modulus of elasticity of the shaft
I=the moment of inertia of the shaft=$\pi d^4/64$
$W_r$=weight of the rotor
$W^s$=weight of the shaft
g=acceleration due to gravity=386 in/sec$^2$
L=distance between supports However, after the motor is run for a short time, the shaft can be assumed to be supported by the oil film 104, itself, as shown in FIG. 10. Thus, the distance between supports may be increased because the support point may be between the two edges 108, 109 of the bearing 102, as shown in FIG. 10, which represents bearing 102, which is on the left side of FIG. 8. Thus, the support point may move from point A to point B in FIG. 10 and, for bearing 102' in FIG. 8, from point A' to point B', thereby increasing the effective distance between the supports from L to L+ΔL. Moreover, this support point may begin to act as an additional spring system 106, 106', as schematically illustrated in FIG. 11, which, although reducing the applicability of the above model, would, nonetheless, reduce the natural frequency of the rotor/shaft/bearing system.

Of the three possible causes, it was found through actual measurement that the oil film is the largest contributor to the reduction in the natural frequency of the rotor, irrespective of whether the oil's effect is due to cause (1) or (2). In any event, the noise was found to be caused by the shaft impacting the bearing once per revolution.

In the claims below, it should be understood that a "portion of a plurality of laminations" refers to a number of laminations less than all of the plurality of laminations, and that these laminations may or may not be adjacent to one another in the stack of laminations. Thus, it should not be assumed that the "portion" necessarily forms a single set of adjacent laminations, but rather it should be assumed that the "portion" may comprise laminations in one or more groups that are not necessarily adjacent in the stack of laminations.

The description and examples provided above are intended to be exemplary only, and not limiting, as one skilled in the art would recognize that may variations are possible within the scope of the invention. Thus, the scope of the invention should be determined by reference to the claims appended below in conjunction with the specification, including the full range of equivalents allowed under applicable law.

What is claimed is:

1. A method of tuning a rotor to reduce unwanted noise and vibration from a motor, said method comprising the steps of:

(a) selecting a first motor comprising a first shaft, a first set of at least one bearing supporting said first shaft, a first plurality of laminations stacked axially along a first length of said first shaft, and a first stator, wherein said first shaft, first set of at least one bearing, and first plurality of laminations comprise a first shaft system having a first natural frequency, and said first plurality of laminations engage said first shaft over a first length, not necessarily continuous, of said first shaft;

(b) measuring said first natural frequency;

(c) selecting an increment to said first natural frequency;

(d) constructing a second motor comprising a second shaft, a second set of at least one bearing supporting said second shaft, a second plurality of laminations stacked axially along a second length of said second shaft, and a second stator, wherein said second motor and said first motor have like dimensions and numbers of bearings, except that said second plurality of laminations engage said second shaft over a selected second length, not necessarily continuous, of said second shaft, and wherein said selected second length is shorter than said first length if said increment is negative, and is longer if said increment is positive.

2. The method of claim 1, wherein the step of constructing said second motor comprises the step of counterboring a central hole in at least one of said second plurality of laminations so that a diameter of said central hole exceeds a diameter of said second shaft by not more than 0.01", so that the counterbored lamination does not engage said second shaft; and a different number of laminations are counterbored in said first motor and said second motor.

3. The method of claim 2 wherein the step of constructing said second motor comprises a step of pressing said second plurality of laminations onto said second shaft.

4. The method of claim 2 wherein the step of constructing said second motor comprises a step of engaging a portion less than an entirety of said second plurality of laminations on an enlarged section of said second shaft.

5. The method of claim 2 wherein the step of constructing said second motor comprises a step of engaging a portion less than an entirety of said second plurality of laminations on a splined section of said second shaft.

6. The method of claim 2 wherein said second shaft comprises regions around which a first portion less than an entirety of said second plurality of laminations is stacked but not engaged thereto, and regions around which a remaining second portion of said second plurality of laminations is stacked and engaged thereto.

7. The method of claim 2 wherein the step of constructing said second motor comprises the step of hot dropping said second plurality of laminations onto said second shaft.

8. A method of timing a rotor to reduce unwanted noise and vibration from a motor, said method comprising the steps of:

counterboring a selected number of first laminations of a rotor so that said first laminations have a center hole larger than a shaft; and assembling said first laminations with second laminations having a center hole dimensioned to engage said shaft to produce said rotor wherein the selected number of first laminations is selected to provide a specific rotor resonant frequency.

9. The method of claim 8 wherein the number of counterbored first laminations is a decreasing function of the rotor resonant frequency.

10. The method of claim 8 wherein said counterbored first laminations have a central hole exceeding the diameter of said shaft by no more than 0.01", so that the counterbored laminations do not engage said shaft.

11. A method of producing electric motors to reduce vibration of the motor during operation, the method comprising the steps of:
(a) determining a resonant frequency of a first rotor assembly within an electric motor; and
(b) adjusting a resonant frequency of additional manufactured rotor assemblies by changing a proportion of rotor laminations engaging a shaft of each additional rotor assembly relative to a proportion of laminations not directly engaging the shaft while maintaining the size and substantially maintaining the mass of the rotor assembly, said change of proportion being relative to the first rotor assembly.

12. The method of claim 11 wherein:
the determination of the resonant frequency of the first rotor assembly is performed by testing the rotor assembly empirically.

13. The method of claim 11 wherein:
the change of proportion is determined by determining the resonant frequencies of rotor assemblies having different proportions of laminations not directly engaging the shaft and selecting a rotor assembly having a desired resonant frequency from among those so determined.

14. The method of claim 11 wherein:
the changing of the proportion of rotor laminations not directly engaging the shaft occurs by altering a center hole of one or more laminations by increasing a size of the center hole to a size larger than a diameter of the shaft.

15. The method of claim 11 wherein:
the changing of the proportion of rotor laminations not directly engaging the shaft occurs by replacing one or more laminations, each having a center hole of a given diameter for passing the shaft therethrough, with an equal number of laminations having a different diameter center hole.

16. The method of claim 11 wherein:
the changing of the proportion of rotor laminations not directly engaging the shaft occurs by altering a diameter of a portion of the shaft.

* * * * *